(12) United States Patent
Nica et al.

(10) Patent No.: US 10,824,622 B2
(45) Date of Patent: Nov. 3, 2020

(54) DATA STATISTICS IN DATA MANAGEMENT SYSTEMS

(71) Applicant: SAP SE, Walldorf (DE)

(72) Inventors: Anisoara Nica, Waterloo (CA); Anil Kumar Goel, Waterloo (CA)

(73) Assignee: SAP SE, Walldorf (DE)

( * ) Notice: Subject to any disclaimer, the term of this patent is extended or adjusted under 35 U.S.C. 154(b) by 920 days.

(21) Appl. No.: 14/189,433

(22) Filed: Feb. 25, 2014

(65) Prior Publication Data

US 2015/0149441 A1    May 28, 2015

Related U.S. Application Data

(60) Provisional application No. 61/908,558, filed on Nov. 25, 2013.

(51) Int. Cl.
*G06F 16/2453*    (2019.01)

(52) U.S. Cl.
CPC ............... *G06F 16/24542* (2019.01)

(58) Field of Classification Search
CPC .................................. G06F 16/24542
USPC .......................................... 707/719
See application file for complete search history.

(56) References Cited

U.S. PATENT DOCUMENTS

| | | | | |
|---|---|---|---|---|
| 5,706,511 A * | 1/1998 | Tomoda | ............... | G06F 17/3056 |
| 6,023,695 A * | 2/2000 | Osborn | ............. | G06F 17/30595 |
| 6,272,487 B1 * | 8/2001 | Beavin | ............. | G06F 17/30469 |
| 6,366,901 B1 * | 4/2002 | Ellis | ................. | G06F 17/30433 |
| 6,438,537 B1 * | 8/2002 | Netz | ................ | G06F 17/30592 |
| 6,529,901 B1 * | 3/2003 | Chaudhuri | ........ | G06F 17/30463 |
| 6,738,755 B1 * | 5/2004 | Freytag | ............. | G06F 17/30469 |
| 6,947,927 B2 * | 9/2005 | Chaudhuri | ........ | G06F 17/30463 |
| 7,007,009 B2 * | 2/2006 | Bestgen | ............ | G06F 17/30469 |
| 7,010,516 B2 * | 3/2006 | Leslie | ............... | G06F 17/30469 |
| 7,146,363 B2 | 12/2006 | Waas et al. | | |
| 7,171,408 B2 | 1/2007 | Zuzarte | | |
| 7,249,120 B2 * | 7/2007 | Bruno | ............... | G06F 17/30469 |
| 7,299,226 B2 * | 11/2007 | Bruno | ............... | G06F 17/30333 707/714 |
| 7,392,266 B2 * | 6/2008 | Barsness | ........... | G06F 17/30336 |
| 7,447,676 B2 * | 11/2008 | Zait | .................... | G06F 17/30312 |
| 7,552,110 B2 * | 6/2009 | Hrle | ................... | G06F 17/30687 |
| 7,555,484 B2 * | 6/2009 | Kulkarni | ............. | H04L 67/1008 |
| 7,577,679 B2 * | 8/2009 | Sinclair | ............. | G06F 17/30315 |
| 7,636,707 B2 * | 12/2009 | Chaudhuri | ........ | G06F 17/30469 |

(Continued)

OTHER PUBLICATIONS

Extended European Search Report for European Application No. 14003672, dated Mar. 24, 2015, 7 pages.

*Primary Examiner* — Miranda Le
(74) *Attorney, Agent, or Firm* — Sterne, Kessler, Goldstein & Fox P.L.L.C.

(57) ABSTRACT

A system, computer-implemented method, and a computer-readable storage medium for determining estimations to statistical questions. Data statistics used in evaluating estimations to statistical questions are gathered from multiple sources in a database management system. A statistical question comprising, for example, cardinality estimations is received, wherein the question is posed by different database components, such as query optimizer, or execution engine. Estimation for the statistical question is computed, where the estimation is based on multiple data statistics and without using the data referred to in the question.

17 Claims, 6 Drawing Sheets

(56) References Cited

U.S. PATENT DOCUMENTS

| | | | | |
|---|---|---|---|---|
| 7,664,730 B2* | 2/2010 | Ziauddin | G06F 17/30306 | 707/718 |
| 7,877,374 B2* | 1/2011 | Zabback | G06F 17/30469 | 707/688 |
| 7,890,496 B2* | 2/2011 | Li | G06F 17/30967 | 707/713 |
| 7,917,502 B2 | 3/2011 | Cheng et al. | | |
| 7,945,558 B2* | 5/2011 | Krishna | G06F 17/30442 | 707/713 |
| 7,949,631 B2* | 5/2011 | Faunce | G06F 17/30442 | 707/610 |
| 7,991,763 B2* | 8/2011 | Bestgen | G06F 17/30424 | 707/610 |
| 8,051,058 B2* | 11/2011 | Corvinelli | G06F 17/30469 | 707/705 |
| 8,135,701 B2* | 3/2012 | Kutsch | G06F 17/30469 | 707/713 |
| 8,135,702 B2* | 3/2012 | Burger | G06F 17/30474 | 707/713 |
| 8,176,037 B2* | 5/2012 | Yu | G06F 9/505 | 707/713 |
| 8,224,807 B2* | 7/2012 | Lim | G06F 17/30442 | 707/713 |
| 8,229,917 B1* | 7/2012 | Aneas | G06F 17/30469 | 707/713 |
| 8,332,388 B2* | 12/2012 | Chaudhuri | G06F 17/30463 | 707/718 |
| 8,386,450 B2* | 2/2013 | Simmen | G06F 17/30463 | 707/705 |
| 8,423,535 B2* | 4/2013 | Weissman | G06F 17/30442 | 707/718 |
| 8,458,210 B2* | 6/2013 | Arifuddin | H04L 67/1027 | 707/769 |
| 8,600,977 B2* | 12/2013 | Dageville | G06F 17/30469 | 707/718 |
| 8,650,179 B2* | 2/2014 | Driesch, Jr. | G06F 17/30469 | 706/12 |
| 8,789,032 B1* | 7/2014 | Li | G06F 8/443 | 717/151 |
| 8,903,801 B2* | 12/2014 | Belknap | G06F 17/30306 | 707/713 |
| 8,914,354 B2* | 12/2014 | Au | G06F 17/30489 | 707/714 |
| 9,037,536 B2* | 5/2015 | Vos | G06F 17/30306 | 707/608 |
| 9,189,521 B2* | 11/2015 | Rajan | G06F 17/30463 | |
| 9,244,979 B2* | 1/2016 | Zhang | G06F 17/30469 | |
| 9,251,181 B2* | 2/2016 | Gaur | G06F 17/30501 | |
| 2003/0028631 A1* | 2/2003 | Rhodes | G06Q 30/0201 | 709/224 |
| 2005/0004907 A1* | 1/2005 | Bruno | G06F 17/30469 | |
| 2005/0120000 A1* | 6/2005 | Ziauddin | G06F 17/30306 | |
| 2005/0262491 A1* | 11/2005 | Gu | G06F 8/4443 | 717/151 |
| 2005/0267877 A1* | 12/2005 | Chaudhuri | G06F 17/30463 | |
| 2008/0052269 A1* | 2/2008 | Abdo | G06F 17/30469 | |
| 2008/0065592 A1* | 3/2008 | Doyle | H04L 12/58 | |
| 2008/0086444 A1* | 4/2008 | Yu | G06F 17/30477 | |
| 2008/0133454 A1* | 6/2008 | Markl | G06F 17/30457 | |
| 2008/0189243 A1* | 8/2008 | Li | G06F 17/30967 | |
| 2008/0195577 A1* | 8/2008 | Fan | G06F 17/30469 | |
| 2008/0288444 A1* | 11/2008 | Edwards | G06F 17/30469 | |
| 2009/0018992 A1* | 1/2009 | Zuzarte | G06F 17/30433 | |
| 2011/0029507 A1* | 2/2011 | Au | G06F 17/30489 | 707/714 |
| 2011/0320435 A1* | 12/2011 | Collins | G06F 17/30442 | 707/718 |
| 2012/0246158 A1* | 9/2012 | Ke | G06F 17/30463 | 707/736 |
| 2014/0052711 A1* | 2/2014 | Bamba | G06F 17/30241 | 707/718 |
| 2014/0095472 A1* | 4/2014 | Lee | G06F 17/30466 | 707/714 |
| 2014/0214798 A1* | 7/2014 | Nica | G06F 17/30463 | 707/718 |

* cited by examiner

DATA STATISTICS IN DATA MANAGEMENT SYSTEMS

This application claims the benefit of a prior provisional U.S. Patent Application No. 61/908,558 filed on Nov. 25, 2013, which is incorporated herein by reference in its entirety.

BACKGROUND

When a database management system receives a query, the database management system generates a query execution plan. To generate an efficient query execution plan, the database management performs a rule-based and cost-based analysis as it generates the query execution plan.

BRIEF DESCRIPTION OF THE DRAWINGS/FIGURES

The accompanying drawings, which are incorporated herein and form a part of the specification.

In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for configuring data statistics in a database system.

Figure 1:
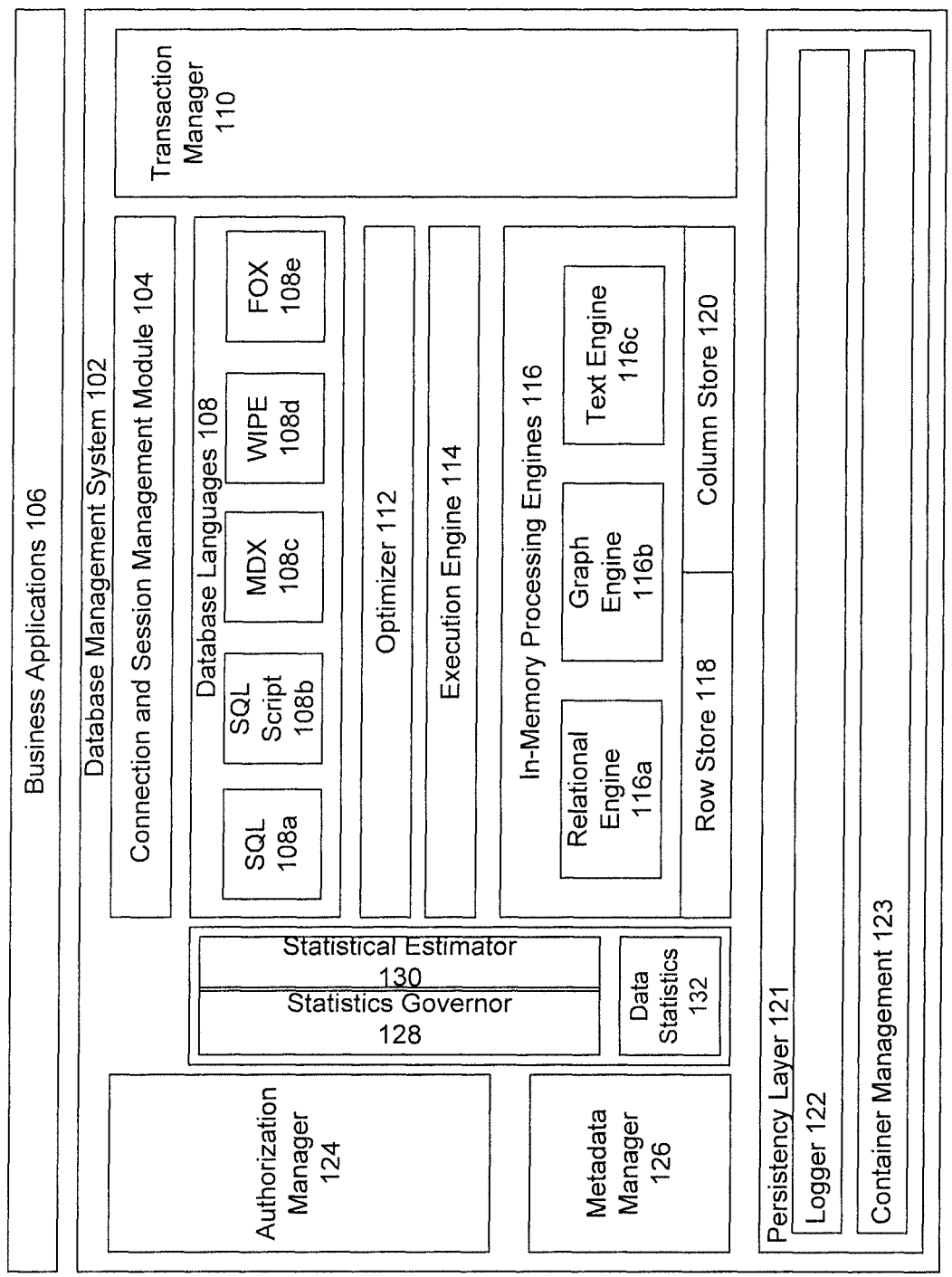
FIG. 1 is a block diagram of an exemplary database management system.

FIG. 1 is a block diagram 100 of an exemplary database management system. In an embodiment, a database management system 102 is a memory-centric data management system that leverages hardware capabilities that include main memory space, multi core CPU and GPU processors, solid-state drive (SSD) storage, though the implementation is not limited to this embodiment.

In an embodiment, database management system 102 includes connection and session management module 104. Connection and session management module 104 creates and manages sessions and connections for database clients (not shown). Database clients include computing devices under a control of a user (also referred to as client devices or clients) that access and/or execute business applications 106. Business applications 106 are custom or generic applications that include applications related to social media, bio-informatics, and business processing, to name a few examples.

Once connection and session management module 104 establishes a session, database clients may use database languages 108, to manipulate data associated with business applications 106. Example database languages 108 include generic database languages, such as, structured query language (SQL) 108a, SQL Script 108b (a scripting language for describing application specific calculations inside the database), a MultiDimensional eXpressions (MDX) 108c, and proprietary languages, such as WIPE (for data graph processing) 108d and FOX (for planning applications) 108e, to give a few examples. In an embodiment, WIPE and FOX are propriety languages of a "High Performance Analytic Appliance" or HANA database management system developed by SAP AG. A database client may use database language 108 to generate strings, such as SQL strings from which database management system 102 generates query execution plans that manipulate data.

In an embodiment, transaction manager 110 ensures that database management system 102 provides ACID (atomicity, consistency, isolation, durability) properties. A person skilled in the art will appreciate that the ACID properties ensure that the database transactions are processed reliably. For example, transaction manager 110 coordinates database transactions, controls transactional isolation, and keeps track of running and closed transactions. In another example, transaction manager 110 ensures that data is not overwritten by multiple transactions that occur concurrently on the same column or table.

In an embodiment, optimizer 112 parses and optimizes database client requests. For example, optimizer 112 may generate a query execution plan for executing the client request in database management system 102. Once generated, optimizer 112 passes the query execution plan to execution engine 114.

In an embodiment, execution engine 114 invokes an in-memory processing engine 116 to process the execution plan. Execution engine 114 may invoke a different in-memory processing engine 116 based on the execution plan type. Example in-memory processing engines 116 include a relational engine 116a, a graph engine 116b and a text engine 116c.

In an embodiment, relational engine 116a processes structured data. Relational engine 116 supports both row- and column-oriented physical representations of relational tables.

For example, row-oriented representation of relational tables is stored in a row store 118, while column-based representations of structured data are stored in a column store 120. Both row store 118 and column store 120 representations of structured data may be stored in one of memories, such as cache memories, described in detail in FIG. 6.

Row store 118 stores records consecutively, in a row-based format.

Column store 120 stores data records as column-based format. In column store 120 columns of data records may be stored as separate sections of data. Because data is stored in columns, analytic algorithms, such as aggregation operators, that do not manipulate all columns of a table, can be implemented in a highly performant and cache-efficient way. Additionally, the column data layout is well suited for various light-weight compression techniques.

In an embodiment, data stored in a column-oriented format may also be compressed. One way to compress data is to apply a sorted dictionary on the data, where each data value maps to an integer value. By reordering the rows in a table, compression, such as run-length encoding (RLE), sparse encoding, or cluster encoding, may be used. Data compression provides several benefits, such as an increase in the amount of data that can be kept in memory, faster query processing, and accelerated table scans that use SIMD (single instruction, multiple data) instructions on multi-core processors to process compressed data.

In an embodiment, a system administrator may specify, at table definition time, whether a new table will be stored in a row- or in a column-oriented format. Row- and column-oriented database tables can be seamlessly combined into one SQL statement, and, subsequently, tables can be moved from one representation form to the other. In an embodiment, a user and application data may be stored in a column-oriented format to benefit from the high compression rate and from the highly optimized access for selection and aggregation queries. In an embodiment, metadata or data with fewer accesses may be stored in a row-oriented format.

Going back to in-memory processing engines 116, graph engine 116b and text engine 116c support efficient representation and processing of unstructured data. For example, graph engine 116b processes data graphs. To enable efficient graph access and processing in graph engine 116b, WIPE 108d provides a set of optimized graph operations. In an embodiment, graph engine 116b supports resource planning applications having large numbers of individual resources and complex mash-up interdependencies. Graph engine 116b also supports efficient execution of transformation processes (such as data cleansing in data-warehouse scenarios) and enables the ad-hoc integration of data from different sources.

In an embodiment, text engine 116c provides text indexing and search capabilities. Example text indexing and search capabilities include search for words and phrases, fuzzy search (which tolerates typing errors), and linguistic search (which finds variations of words based on linguistic rules). In addition, text engine 116c ranks search results and supports searching across multiple tables and views.

In an embodiment, persistency layer 121 provides durability and atomicity to transactions. Persistency layer 121 includes a logger 122 and a page management module 123. Logger 122 logs data, changes to data, and transaction requests to a disk storage. Those transactions and data changes may be performed by in-memory processing engines 116, as well as requests issued by multiple client devices.

Page management module 123 provides an interface for writing and reading data to/from row store 118 and column store to disk storage in the persistency layer 121. In an embodiment, persistency layer 121 stores data that is committed in row store 118 or column store 120 and is then transferred to disk storage.

In an event of database management system 102 crashes or fails, persistency layer 121 uses logger 122 and page management module 123 to ensure that it is restored to the most recent committed state. To restore the most recent committed state, logger 122 uses logs (not shown) that track changes to data stored in persistency layer 121. Persistency layer 121 also ensures that transactions are either completely executed or completely undone. To achieve this efficiently, persistency layer 121 uses techniques such as combining write-ahead logs, shadow paging, and save-points that are known to a person skilled in the relevant art(s).

In an embodiment, database management system 102 includes an authorization manager 124. Authorization manager 124 determines whether a user has the required privileges to execute the requested operations. A privilege grants a right to perform a specified operation (such as create, update, select, or execute). The database management system 102 also supports analytical privileges that represent filters or hierarchy drill-down limitations for analytical queries, as well as control access to values with a certain combination of dimension attributes.

In an embodiment, metadata manager 126 manages metadata in database management system 102. Example metadata includes table definitions, views, indexes, and the definition of SQL script functions.

In an embodiment, database management system 102 also includes a module that answers statistical questions for processing a query. This module includes a statistics governor 128 and statistical estimator 130. Statistics governor 128 and statistical estimator 130 determine estimates, for example a cardinality estimate, for statistical questions posed by different components of database management system 102, and using data statistics generated by different components of database management system 102. In an embodiment, statistical estimates such as, cardinality estimation, are determined in real time when, for example, database management system 102 generates a query execution plan. A cardinality estimate (which is a type of a statistical question) is an approximation to a statistical question posed by one of the components of database management system 102 to statistical estimator 130, and without evaluating the statement asked about in the question. For example, suppose Q is a complex logical sub-expression of a statement, such as, "select T.A from T" or "select*from R JOIN S" where T, R and S are tables in database management system 102. An actual cardinality is the number of rows in the result of Q. A cardinality estimate is an estimate of a number of rows in the result of Q, without evaluating the statement to determine Q.

In an embodiment, a cardinality estimate of Q may include:
an estimated number of distinct rows in Q;
an estimated cardinality of Q; and
an estimated selectivity of a predicate p(T.A)=estimated cardinality of "select*from T where p(T.A)/estimated cardinality of "select*from T".

In an embodiment, statistical questions may be used by cost models during query optimization for different sub-expressions, and by adaptive operators during query execution, data partitioning/distributing, load balancing, etc.

In an embodiment, a statistical question is answered, in part, using data statistics 132. Data statistics 132 are stored in the memory of database management system 102, such as one of memories discussed in FIG. 6. In an embodiment, data statistics 132 include data statistics objects. Data statistics objects may be independent objects built to approximate data. Example data statistics objects may be built for a data source generated for "select T.A from T" and "select R.B, S.C from R JOIN S where R.D>100". In another embodiment, data statistics 132 include special data statistics objects built on a subset of the real data, data sampling, and index probes on an index in database management system 102. In yet another embodiment, data statistics 132 include cached answers to similar questions or queries, such as actual feedback from previous query executions and previous estimates for the query plan executions. In yet another embodiment, data statistics 132 include one- or multi-dimensional histograms, join histograms, statistics on a common table expression (CTE), etc. A person skilled in the art will appreciate that a histogram is a data structure that provides data distribution statistics for one or more columns in a database table, and that a CTE is a temporary result table defined within execution of a single query and exists as long as the query is being processed.

Statistics governor 128 manages data statistics 132. For example, statistics governor 128 queries different components within database management system 102 for data, builds data statistics objects on the data, and then stores data statistics objects in data statistics 132.

In an embodiment, statistics governor 128 also supports data statistics objects' maintenance in the presence of data updates, query feedback, and workload self-managing features. For instance, statistics governor 128 refines and builds parts of data statistics objects. In another instance statistics governor 128 maintains or rebuilds data statistics objects using piggybacking on query execution, merge or load operations. In yet another example, statistics governor 128 creates, drops, or maintains data statistic objects in data statistics 132 based on usage reported by statistical estimator 130. In yet another example, statistics governor 128 caches data statistics objects in a distributed database environment, to name a few examples.

In an embodiment, statistics governor 128 also estimates "simple" predicates and maintains useful statistics by piggybacking on other operations. A predicate is a portion of a query string that specifies conditions that require evaluation. For example, statistics governor 128 determines whether there is a need to statistically recommend, build or drop data statistics objects, histograms, statistics on CTE, etc. In an embodiment, statistics governor 128 makes the above determination dynamically when, for example, statistics governor 128 receives a question that requires estimation.

Statistics governor 128 also monitors the health and efficiency of data statistics 132. For example, statistics governor 128 drops data statistics 132 that are no longer useful, such as data statistics 132 that have become outdated such that the usage falls below a predefined threshold or are never used.

In an embodiment, statistics governor 128 interacts with multiple components of database management system 102, as discussed in detail in FIGS. 2-4, below. For example, statistics governor 128 interacts with optimizer 112 and execution engine 114 to maintain and update data statistics 132 during query plan execution, query plan generation and query plan rebuilds. Statistics governor 128 also invalidates and maintains data statistics 132 during the update operation.

In an embodiment, statistical estimator 130 receives questions from various components in database management system 102. Once statistical estimator 130 receives a question posed by various database management system 102 components, statistical estimator 130 finds the relevant data statistics 132 and generates an answer to the statistical question. For example, statistical estimator 130 uses one- or multi-dimensional histograms to estimate selectivity of local predicates on table T.X. In another example, statistical estimator 130 uses join histograms to estimate selectivity of equi-joins with local predicates. For example, statistical estimator 130 estimates selectivity for "T join R ON T.X=R.X and T.X>10" where T.X=R.X is an equi-join predicate and T.X>10 is a local predicate on "X". In yet another example, statistical estimator 130 uses statistics of CTE to answer a posed question. For example, statistical estimator 130 finds the relevant histograms to estimate number of distinct values in CTE columns, and cardinality of the CTE. In yet another embodiment, statistical estimator 130 obtains statistics from other sources, such as primary and secondary indexes built for a table, sampling sources and cached answers to previous calculation made by components in database management system 102. In a further embodiment, statistical estimator 130 exploits statistics from multiple, overlapping and conflicting data sources, and discovers and manipulates dependent predicates. In a further embodiment, statistical estimator 130 also queries the history of answers to previous statistical questions which can be used to answer the posed question. In an embodiment, statistical estimator 130 may be used by optimizers 112 of database management system 102 during the optimization phase, where optimizer 112 builds query execution plan using one or multiple enumeration algorithms. These enumeration algorithms may include dynamic programming algorithms, transformation based algorithms, and heuristics based algorithms, to name a few examples.

In another embodiment, statistical estimator 130 may be used by execution engine 114 during query execution for adaptive 'chose' operators, cache plan validation, etc.

When statistical estimator 130 receives a question, statistical estimator 130 uses statistics governor 128 to find relevant data statistics 132. Statistical estimator 130 then estimates an answer to the statistical question, for example, it estimates the cardinality of different types of logical expressions using the data statistics sources found by statistics governor 128

In an embodiment, statistical estimator 130 generates an answer to the received question in real time, for example, during query plan generation or execution.

Figure 2:
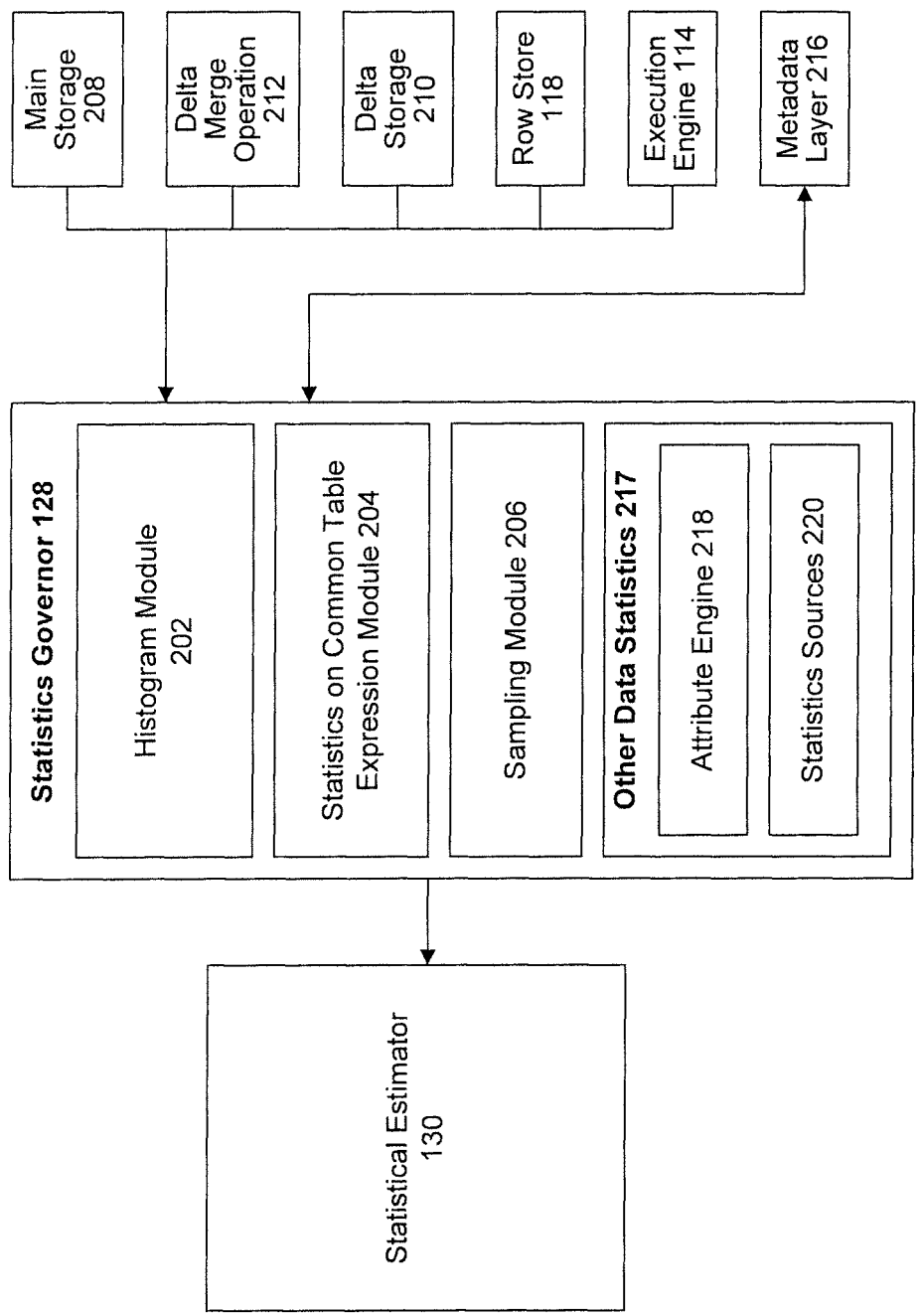
FIG. 2 is a block diagram of a statistics governor and statistical estimator, according to an embodiment.

FIG. 2 is a block diagram 200 of a statistics governor and statistical estimator, according to an embodiment. Block diagram 200 shows multiple data and information inputs and outputs that statistics governor 128 uses to collect data statistics for use by statistical estimator 130.

In block diagram 200, statistics governor 128 includes a histogram module 202, a CTE module 204 and a sampling module 206. Histogram module 202 manages single, multiple and join histograms utilized by statistics governor 128 that may have been created by other components in database management system 102. For example, histogram module 202 builds, rebuilds, maintains, repairs, drops and persists single, multiple and join histograms accessible to statistics governor 128 so that the histograms are available and up to date for use by statistical estimator 130.

In an embodiment, CTE module 204 manages CTE statistics in the context of statistics governor 128. For example, CTE module 204 caches, maintains and drops the available CTE tables and calculates CTE statistics such that CTE data is available and up to date for use by statistical estimator 130.

In an embodiment, statistics governor 128 also includes a sampling module 206. Sampling module 206 samples data, for example data stored in tables, in database management system 102 and based on those samples makes inferences regarding that data. Sampling module 206 also maintains and drops the available sampling statistics such that the sampling data is available and up to date for use by statistical estimator 130.

In an embodiment, histogram module 202, CTE module 204 and sampling module 206 uses data from other components within database management system 102. Example components may include main storage 208, delta storage 210, delta merge operation 212, row store 218, and execution engine 114.

In an embodiment, main storage 208 may be an in-memory memory storage. Main storage 208 may be a column-based or a row based storage in database management system 102 that stores data used and manipulated by one or more applications before the data is moved to disk storage in for example, a persistency layer 121. In an embodiment, data stored in main storage 208 may be stored in a compressed format optimized for memory space and read performance.

In an embodiment, delta storage 210 may be an in-memory storage that initially receives data and data updates from applications used by database clients. In an embodiment, data stored in delta storage 210 is stored in a delta format, such as, changes between an initial and final data state. Additionally, delta storage 210 may be optimized for read and write access. In an embodiment, delta storage 210 may also be column-based or row-based storage in database management system 102.

In an embodiment, delta merge operation 210 moves data from delta storage 210 to main storage 208. For example, delta merge operation 212 performs a synchronization check to determine which data requires a merge between delta storage 210 and main storage 208. If data that requires synchronization is identified, delta merge operation 212 moves data from delta storage 210 to main storage 208. Statistics governor 128 then gathers data during delta merge operation 210 and builds data statistics objects for future use to answer statistical questions.

Metadata layer 216 includes metadata on a variety of objects, such as relational tables, columns, indexes, definitions of functions and objects, etc., stored in database management system 102. A person skilled in the art will appreciate that the metadata is data about tables, columns, indexes, functions and objects in database management system 102. In an embodiment, metadata layer may also include data on functions and structures that a system administrator uploaded into database management system 102 using data definition language (DDL).

In an embodiment, statistics governor 128 also uses other data statistics 217. These other data statistics 217 may be generated using attribute engine 218 and specific statistics sources 220. Attribute engine 218 can generate data statistics 217 used by statistical estimator 130. For example, attribute engine 218 provides data statistics such as simple predicates selectivity estimation, the number of distinct values in a table, the number of top "N" table values in a column, etc.

Specific statistics sources 220 generate data statistics 217. Statistics sources 220 may provide estimates from indexes on database tables, or estimates for data stored in database dictionary, to name a few examples.

In an embodiment, statistical estimator 130 uses estimation algorithms to generate an answer to statistical questions using multiple data statistics from statistics governor 128.

For example, information from delta storage 210 provides statistical estimator 130 with statistics to estimate the following statistical questions:
  "T.A theta constant" for T.A in the delta of the table T;
  "T.A between constant1 and constant2" for T.A in the delta of the table T; and
  "T.A=R.A" for T.A and R.A in their delta stores, where T and R are tables;
to give a few examples. Statistical estimator 130 can then use these estimations to generate estimations for questions relating to the whole table T.

Figure 3:
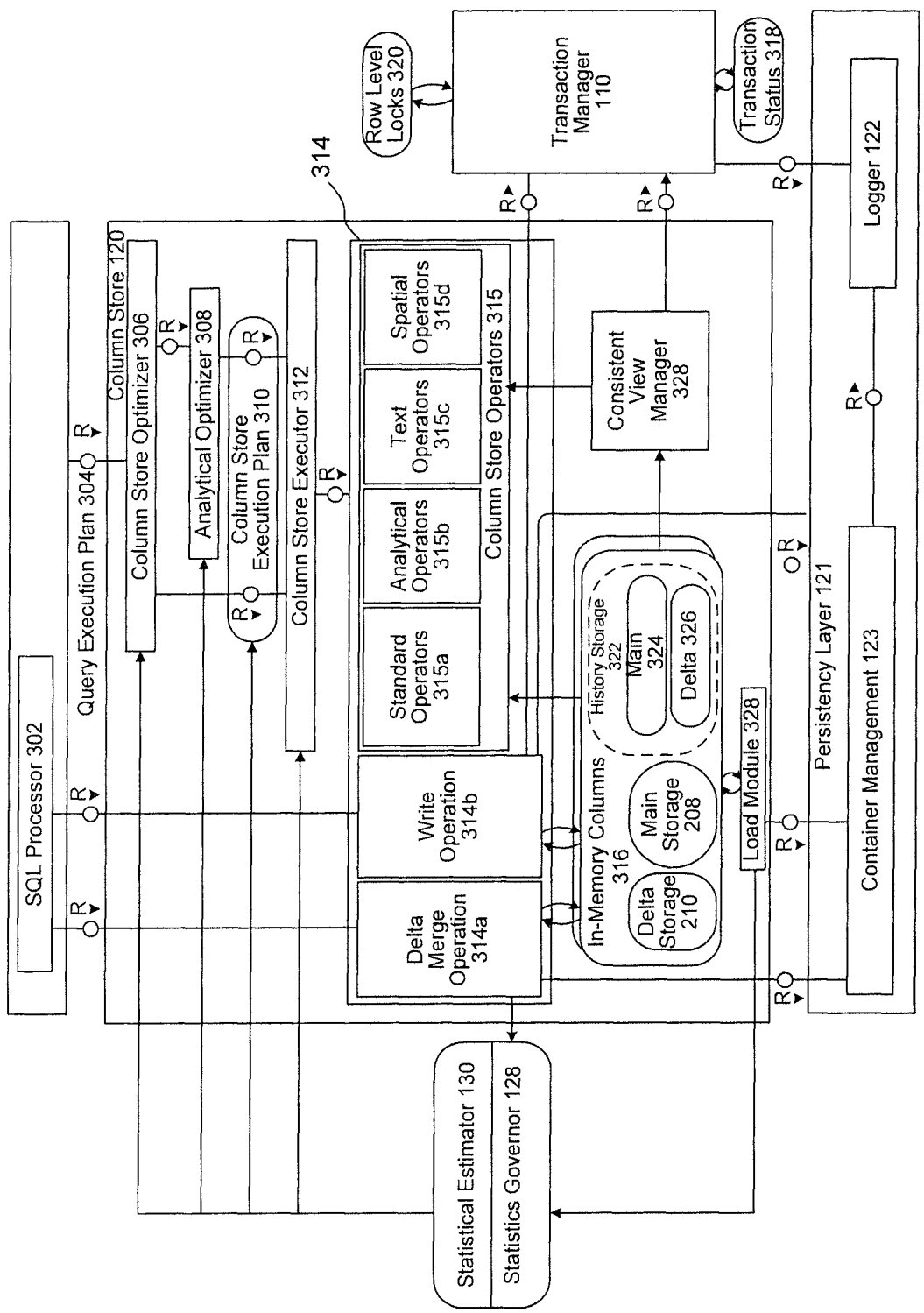
FIG. 3 is a block diagram of a system that provides statistical estimations in a column store, according to an embodiment.

FIG. 3 is a block diagram 300 of a system that provides statistical estimations in a column store, according to an embodiment. Block diagram 300 includes a SQL processor 302 and a column store 120. SQL processor 302 processes SQL commands generated using SQL 108a and SQL 108b, and generates a query execution plan 304, or triggers a delta merge operation 314a or write operation 314b. The details of how SQL processor 302 generates query execution plan 304 are discussed in FIG. 4. Once SQL processor 302 generates query execution plan 304, query execution plan 304 may be executed or further optimized in column store 120. If SQL processor 302 triggers delta merge operation 314a or write operation 314b, then this operation is executed.

Delta merge operation 314 and write operation 314b manipulate data stored in in-memory columns 316 in database management system 102. For example, delta merge operation 314a merges in-memory columns 316 in delta storage 210 with main storage 208. In another example, write operation 314b writes data to in-memory columns 316 that is part of main storage 208.

In an embodiment, as part of delta merge operation 314a, statistics governor 128 receives data associated with delta merge operation 314a. This data may be used to build data statistics 132. In this way, statistics governor 128 provides statistics to statistical estimator 130 that generates estimations for subsequent query execution plan 304.

In an embodiment, query execution plan 304 can also proceed to a column store optimizer 306.

To process query execution plan 304, column store 120 includes column store optimizer 306, an analytical optimizer 308 and a column store executor 312. Column store optimizer 306 is an optimizer that further optimizes query execution plan 304 for efficiently retrieving data from column-based tables in column store 120. In an embodiment, when query execution plan 304 is a data modeling query, column store optimizer 306 may use analytical optimizer 308 to optimize query execution plan 304. In an embodiment, when optimizing query execution plan 304, column store optimizer 306 and analytical optimizer 308 use statistical estimator 130 to find answers to statistical questions, such as cardinality estimations, associated with query plan optimization.

Upon completion, column store optimizer 306 and/or analytical optimizer 308 generate a column store execution plan 310. Included in column store execution plan 310 may be cardinality estimations from statistical estimator 130 that aide with an efficient execution of column store execution plan 310.

Column store executor 312 executes column store execution plan 310. To execute column store execution plan 310, column store executor 312 uses column store operators 315. Column store operators 315 are commands specific to manipulating data stored in the column-based format. Example column store operators 315 include standard operators 315a, analytical operators 315b, text operators 315c, and spatial operators 315d. Additionally, column store executor 312 uses delta merge operations 314a and write operation 314b, discussed above. To optimize execution of column store execution plan 310, column store executor 312 also uses statistical estimator 130.

In an embodiment, as column store execution plan 310 executes, it performs transaction on data in in-memory columns 316. In-memory columns 316 are columns of tables stored in column store 120's memory. Transaction manager 110 coordinates transactions during execution and ensures that the transactions comply with ACID properties. For example, transaction manager 110 tracks the transaction status 318 of each transaction. Transaction manager 110 also performs row level locks 320 on transactions that require locks on rows in a column when column store execution plan 310 performs actions that access and manipulate data in in-memory columns 316. In another example, transaction manager also monitors transactions that occur as a result of delta merge operation 314a and write operation 314b.

In an embodiment, in-memory columns 316 also include history storage 322. History storage 322 includes records of past transactions, such as main transactions 324 and delta transactions 326. Main transactions 324 are transactions that have previously occurred in main storage 208. Delta transactions 326 are transactions that occurred in delta storage 210.

In an embodiment, page management module 123 ensures that in-memory columns 316 are restored to the most recent committed state in the event of database management system 102 crush or failure, as discussed in FIG. 1. During the restoration process, page management module 123 loads or uploads data stored in persistency layer 121 into delta storage 210, main storage 208, and history storage 322. In an embodiment, page management module 123 uses the load module 328 to upload data to in-memory columns 316. As part of the upload process, load module 328 also communicates with statistics governor 128 that tracks the uploaded data and generates data statistics 132.

Figure 4:
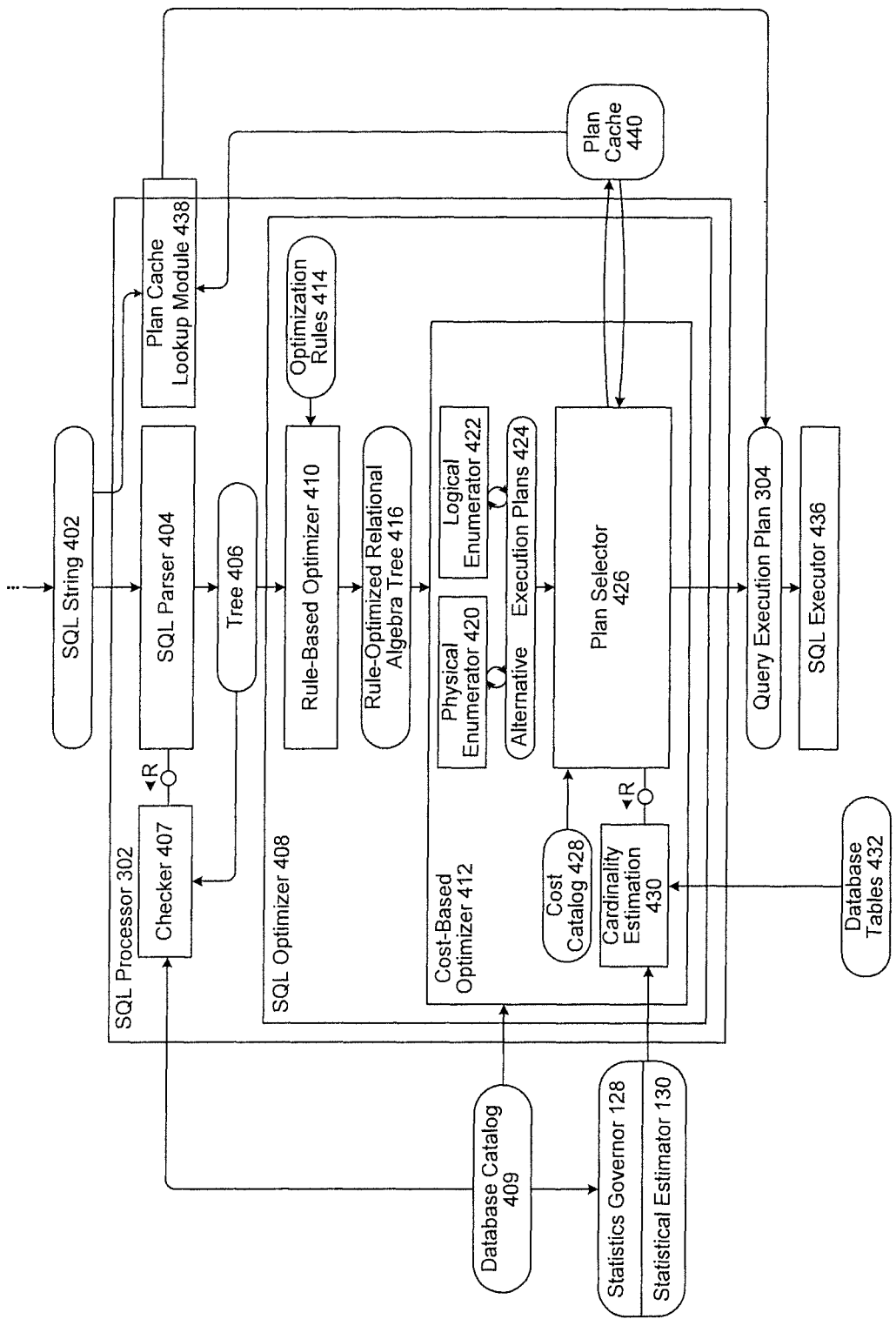
FIG. 4 is a block diagram of a system that generates cardinality estimation while generating a query execution plan, according to an embodiment.

FIG. 4 is a block diagram 400 of a system that generates estimations while generating a query execution plan, according to an embodiment. SQL processor 302 generates a query execution plan for a query received from a database client or a user (not shown). For example, a client transmits a SQL string 402 to database management system 102 that includes SQL processor 302. SQL string 402 may include instructions for data access in the Structured Query Language (SQL) or another query language. SQL processor 302 interprets SQL string 402 and generates query execution plan, such as query execution plan 304 discussed below.

When SQL processor 302 receives SQL string 402, SQL processor 302 uses SQL parser 404 to parse SQL string 402. SQL parser 404 converts SQL string 402 into a binary tree data structure or tree 406, although other types of data structures may be used. Tree 406 represent SQL string 402 in a format that SQL processor 302 uses to generate a query execution plan 304.

In an embodiment, SQL parser 404 also communicates with checker 407. Checker 407 checks the structure and syntax of tree 406, eliminates duplicates from tree 406 and determines whether tables and columns requested in the SQL query are present in the database memory storage. Checker 407 also communicates with database catalog 409. Database catalog 409 includes metadata that defines database objects that include tables, views, indexes, user defined data statistics objects, etc. In an embodiment, database catalog 409 also includes metadata layer 216 discussed in FIG. 2.

SQL optimizer 408 uses tree 406 to generate a query execution plan 304. To generate query execution plan 304, SQL optimizer 408 includes a rule based optimizer 410 and a cost based optimizer 412. Rule based optimizer 410 uses optimization rules 414 to generate a rule-optimized relational algebra tree 416 from tree 406. Example optimization rules 414 may be preconfigured or uploaded by a system administrator into SQL optimizer 408 and are rules that determine how SQL string 402 will be executed.

Cost-based optimizer 412 receives rule-optimized relational algebra tree 416. Cost-based optimizer 412 generates multiple alternative query execution plans 424 based on the cost, and selects query execution plan 304 with the lowest execution cost. For example, cost-based optimizer 412 determines the cost of alternative query execution plans 424 in terms of input/output (I/O) operations, CPU usage, memory usage, available parallel execution capability, etc. To generate multiple query execution plans, cost-based optimizer 412 examines primary index access, secondary index access, relation table joins, predicates, etc. To select query execution plan 304, cost-based optimizer 412 uses a physical enumerator 420 and logical enumerator 422. Physical enumerator 420 determines the means and the order of operations for executing each of alternative query execution plans 424. Logical enumerator 422 generates the sequence of algebraic operations for each of alternative query execution plans 424.

Plan selector 426 selects query execution plan 304 from alternative execution plans 424. As part of the selection, plan selector 426 queries cost catalog 428 and statistical estimator 130. In an embodiment, cost catalog 428 may be a table or a listing of processor and memory cost for executing entire or a subset of each query execution plan in alternative execution plans 424.

As discussed above, plan selector 426 issues questions to statistical estimator 130 regarding estimates for executing a subplan of or the whole plan in alternative execution plans 424. For example, plan selector 426 may query statistical estimator 130 to determine the estimated number of rows for accessing a primary or secondary index, or joining tables in each of alternative query execution plans 424, or selectivities of predicates in tables manipulated using alternative execution plans 424.

Statistical estimator 130 then generates estimates used by cardinality estimation 430 for executing alternative execution plans 424 on database tables 432. For example, plan selector 426 may estimate how expensive it would be to evaluate a join, access primary and secondary index, etc., for each of alternative execution plans 424, how to best partition sub-expressions in each of alternative execution plans 424 such that query execution plans 424 are executed in a load balanced manner, etc.

Based on the cost computed using the information provided by cost catalog 428 and cardinality estimation 430, plan selector 426 selects query execution plan 304.

Once selected SQL executor 436 executes query execution plan 304, or passes query execution plan 304 to column store 120.

In an embodiment, SQL processor 302 also includes a plan cache lookup module 438 and plan cache 440. Plan cache 440 stores query execution plan 304 and alternative execution plans 424 generated for SQL string 402. In this way, when a database client subsequently issues SQL string 402, plan cache lookup module 438 searches plan cache 440 and identifies whether query execution plan 304 and alternative execution plans 424 were previously generated for SQL string 402. If plan cache lookup module 438 identifies that query execution plan 304 and alternative execution plans 424 were previously generated, SQL processor 302 bypasses the query plan generation processes and proceeds to plan selector 426. Plan selector 426 then selects one of query execution plans in plan cache 440 that were previously generated for SQL string 402. In an embodiment, plan cache lookup module 438 may also select query execution plan 304 from plan cache 440.

Figure 6:
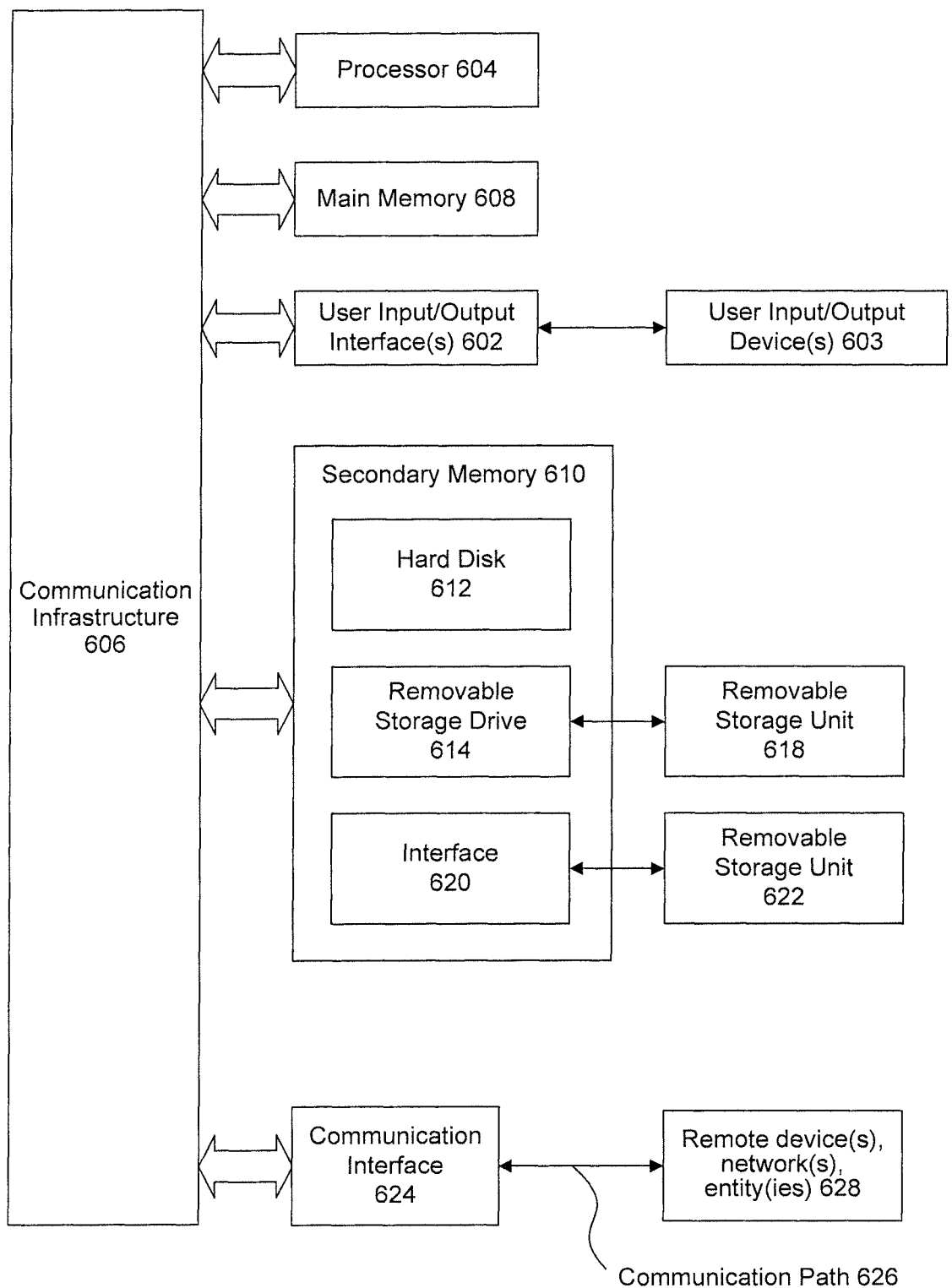
FIG. 6 is an exemplary computing device where the contemplated embodiments can be implemented.

In an embodiment, plan cache 440 is a cache memory storage that can be one of memory storages discussed in FIG. 6.

Figure 5:
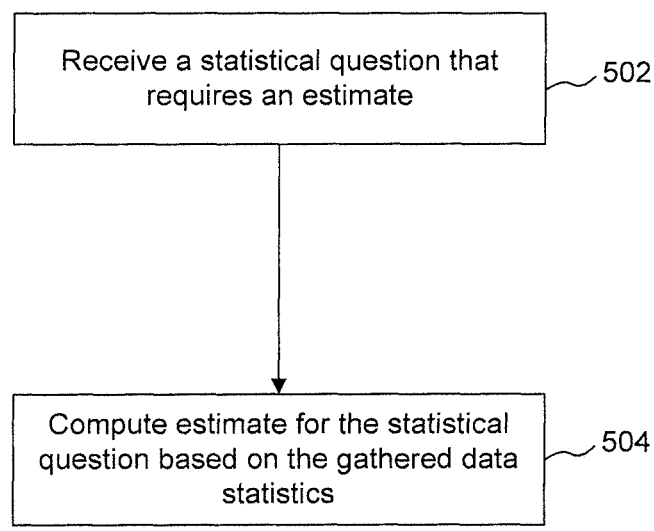
FIG. 5 is a flowchart of a method for generating an answer to a statistical question, according to an embodiment.

FIG. 5 is a flowchart of a method 500 for generating an answer to a statistical question, according to an embodiment.

At operation 502, a statistical question requiring estimation is received. For example, one of components of database management system 102 queries statistical estimator 130 for cardinality estimation.

At operation 504, estimation for the question is computed. For example, statistical estimator 130 uses data statistics 132 provided by at least one of statistics governor 128, statistics sources 220 and attribute engine 218 to generate the estimation for the question, in real-time. As discussed above, statistics governor 128, statistics sources 220 and attribute engine 218 gather data statistics 132 in database management system 102. As also discussed above the estimation may be used to determine the cost of executing query execution plan 304 or the selection of query execution plan 304 from alternative query execution plans 424.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communication path 626, which may be wired and/or wireless, and which may include any combination of LANs, WANs, the Internet, etc. Control logic and/or data may be transmitted to and from computer system 600 via communication path 626.

It is to be appreciated that the Detailed Description section, and not the Summary and Abstract sections (if any), is intended to be used to interpret the claims. The Summary and Abstract sections (if any) may set forth one or more, but not all, contemplated exemplary embodiments, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

What is claimed is:

1. A method comprising:
   determining that a first set of data statistic objects have been generated based on data maintained by a plurality of components of a database, wherein the database statistic objects are maintained during subsequent data updates;
   receiving one or more statistical questions requiring an estimate for generating a query execution plan associated with processing a respective statement relevant to a database, wherein the one or more statistical questions are posed by the database process prior to executing the respective statement;
providing the answer to the one or more statistical questions in real-time based on one or more of the first set of data statistic objects, wherein the answer is an approximation computed without evaluating the respective statements, and wherein a usage for each of one or more data statistic objects of the first set is maintained relative to whether or not each respect data statistic object was relevant to the statements;
determining, by the processor, that the usage for a particular one of the data statistic objects of the first set falls below a threshold usage level;
removing the particular data statistic object with usage that is below the threshold usage level from the first set of data statistic objects, wherein the removed particular data statistic object is no longer maintained by one or more of the plurality of components after it is removed;
querying data maintained by the plurality of components of the database relevant to the one or more data statistic objects remaining in the first set, wherein during a processing of a subsequent statistical question only the remaining one or more data statistic objects of the first set are used to provide an answer to the subsequent statistical question, wherein data corresponding to the removed particular data statistic object is not maintained by the one or more of the plurality of components during the processing of the subsequent statistical question; and
generating a query execution plan for the query based on the execution cost estimate.

2. The method of claim 1, wherein the database process load balances the database system, and further comprising:
load balancing the database system based on the answer.

3. The method of claim 1, further comprising:
building a data statistics object from the gathered data statistics, wherein the data statistics object is associated with performance of a component of the plurality of components in the database system.

4. The method of claim 3, further comprising:
modifying the data statistics object based on data generated by the plurality of components of the database system.

5. The method of claim 1, further comprising:
modifying a data statistics object based on a plurality of statistical questions posed by the plurality of components in the database system.

6. The method of claim 1, further comprising:
retrieving a data statistics object that generates the answer to the statistical question;
generating the answer to the statistical question based on using the data statistics object; and
generating the execution cost estimate based on the answer.

7. The method of claim 1, further comprising:
retrieving a first data statistics object and a second data statistics object; and
generating the answer to the statistical question by combining the first data statistics object and the second data statistics object.

8. The method of claim 1, wherein the usage report indicates that the particular one of the data statistics of the first set is not used over multiple executions, and wherein the subsequent gathering does not include the particular one of the data statistic that was not used.

9. The method of claim 1, wherein the subsequent gathering comprises querying a plurality of components within a database management system and building the second set of data statistics based on the queried data.

10. The method of claim 1, wherein the received statistical question is a cardinality estimate posed by a component of a database management system.

11. The method of claim 1, wherein the threshold usage level indicates that one or more data statistics of the subset are outdated.

12. The method of claim 1, wherein the querying comprises:
determining, by a statistical estimator, an answer to the subsequent statistic question without data corresponding to the removed particular data statistic object.

13. A system comprising:
a memory;
at least one processor coupled to a memory, wherein the at least one processor is further configured to:
determine that a first set of data statistic objects have been generated based on data maintained by a plurality of components of a database, wherein the database statistic objects are maintained during subsequent data updates;
receive one or more statistical questions requiring an estimate for generating a query execution plan associated with processing a respective statement relevant to a database, wherein the one or more statistical questions are posed by the database process prior to executing the respective statement;
provide the answer to the one or more statistical questions in real-time based on one or more of the first set of data statistic objects, wherein the answer is an approximation computed without evaluating the respective statements, and wherein a usage for each of one or more data statistic objects of the first set is maintained relative to whether or not each respect data statistic object was relevant to the statements;
determine that the usage for a particular one of the data statistic objects of the first set falls below a threshold usage level;
remove the particular data statistic object with usage that is below the threshold usage level from the first set of data statistic objects, wherein the removed particular data statistic object is no longer maintained by one or more of the plurality of components after it is removed; and
query data maintained by the plurality of components of the database relevant to the one or more data statistic objects remaining in the first set, wherein during a processing of a subsequent statistical question only the remaining one or more data statistic objects of the first set are used to provide an answer to the subsequent statistical question, wherein data corresponding to the removed particular data statistic object is not maintained by the one or more of the plurality of components during the processing of the subsequent statistical question; and
generate a query execution plan for the query based on the execution cost estimate.

14. The system of claim 13, wherein the at least one processor is furthered to:
build a data statistics object from the gathered data statistics, wherein the data statistics object is associated with performance of a component of the plurality of components in the database system.

15. The system of claim 13, wherein the at least one processor is furthered to:
    modify the data statistics object based on data generated by the plurality of components of the database management system.

16. The system of claim 13, wherein the at least one processor is furthered to:
    retrieve a data statistics object that generates the answer to the statistical question;
    generate the answer to the statistical question based on the data statistics object; and
    generate the execution cost estimate based on the answer.

17. A computer-readable device, comprising a memory having instructions stored thereon that, when executed by at least one processor of a computing device, causes the at least one computing device to perform operations comprising:
    determining that a first set of data statistic objects have been generated based on data maintained by a plurality of components of a database, wherein the database statistic objects are maintained during subsequent data updates;
    receiving one or more statistical questions requiring an estimate for generating a query execution plan associated with processing a respective statement relevant to a database, wherein the one or more statistical questions are posed by the database process prior to executing the respective statement;
    providing the answer to the one or more statistical questions in real-time based on one or more of the first set of data statistic objects, wherein the answer is an approximation computed without evaluating the respective statements, and wherein a usage for each of one or more data statistic objects of the first set is maintained relative to whether or not each respect data statistic object was relevant to the statements;
    determining that the usage for a particular one of the data statistic objects of the first set falls below a threshold usage level;
    removing the particular data statistic object with usage that is below the threshold usage level from the first set of data statistic objects, wherein the removed particular data statistic object is no longer maintained by one or more the plurality of components after it is removed;
    querying data maintained by the plurality of components of the database relevant to the one or more data statistic objects remaining in the first set, wherein during a processing of a subsequent statistical question only the remaining one or more data statistic objects of the first set are used to provide an answer to the subsequent statistical question, wherein data corresponding to the removed particular data statistic object is not maintained by the one or more of the plurality of components during the processing of the subsequent statistical question; and
    generating a query execution plan for the query based on the execution cost estimate.

* * * * *